(12) United States Patent
Mancini

(10) Patent No.: US 10,039,409 B2
(45) Date of Patent: Aug. 7, 2018

(54) BEVERAGE BREWER

(71) Applicant: Stephen A. Longo, Clinton, CT (US)

(72) Inventor: Graziano Mancini, Wolcott, CT (US)

(73) Assignee: Stephen A. Longo, Clinton, CT (US)

( * ) Notice: Subject to any disclaimer, the term of this patent is extended or adjusted under 35 U.S.C. 154(b) by 92 days.

(21) Appl. No.: 15/091,028

(22) Filed: Apr. 5, 2016

(65) Prior Publication Data

US 2017/0280920 A1    Oct. 5, 2017

(51) Int. Cl.
*A47J 31/06* (2006.01)
*A47J 31/30* (2006.01)

(52) U.S. Cl.
CPC ......... *A47J 31/303* (2013.01); *A47J 31/0663* (2013.01)

(58) Field of Classification Search
CPC ...... A47J 31/303; A47J 31/0663; A47J 31/04; A47J 31/34; A47J 31/3609
USPC ........................................ 99/293, 303, 302 P
See application file for complete search history.

(56) References Cited

U.S. PATENT DOCUMENTS

| 3,077,156 | A |   | 2/1963  | Egi et al. |             |
|-----------|---|---|---------|------------|-------------|
| 3,321,113 | A | * | 5/1967  | Conry      | G01F 11/265 |
|           |   |   |         |            | 222/477     |
| 5,586,484 | A | * | 12/1996 | Piazza     | A47J 31/0663|
|           |   |   |         |            | 426/433     |
| 5,970,850 | A | * | 10/1999 | Piazza     | A47J 31/303 |
|           |   |   |         |            | 99/302 P    |
| 6,823,771 | B2| * | 11/2004 | Piazza     | A47J 31/303 |
|           |   |   |         |            | 99/302 P    |
| 2004/0182247 | A1 |   | 9/2004 | Guerrero |            |
| 2005/0132892 | A1 | * | 6/2005 | Hall     | A47J 31/047 |
|           |   |   |         |            | 99/279      |

(Continued)

FOREIGN PATENT DOCUMENTS

DE         10334526 B4     7/2015

*Primary Examiner* — Dana Ross
*Assistant Examiner* — Kuangyue Chen
(74) *Attorney, Agent, or Firm* — Gordon & Jacobson, P.C.

(57) ABSTRACT

A beverage brewing device includes a lower container for receiving and heating water, a connected upper container for receiving beverage, and a piston-cylinder assembly for receiving grounds, captured within the lower container. The piston-cylinder assembly includes a cylinder, a piston movable in the cylinder, a conical diffuser fixedly attached to the piston, and a freely movable mass disposed between the piston and the conical diffuser. The piston and the conical diffuser define an expansion chamber therebetween. The chamber is formed between a diffuser plate forming the top of the piston and an inner conical surface of the diffuser, which defines an orifice functioning as a nozzle. The diffuser plate has a plurality of holes, on which the grounds are placed. The mass is seated at a valve seat at the entrance of the expansion chamber to operatively block the flow of fluid through the nozzle when the pressure of the fluid is insufficient to displace the weight of the mass. When water is heated in the lower container becomes pressurized sufficiently to pass through the nozzle and displace the seated mass from the valve seat, the water passes through the nozzle at relatively high pressure and velocity, and enters the expansion chamber at lowered pressure. It then flows through the diffuser plate, through the grounds, and into the upper chamber.

24 Claims, 7 Drawing Sheets

(56) References Cited

U.S. PATENT DOCUMENTS

2010/0132805 A1\* 6/2010 Kshirsagar ............ F16K 24/046
137/202
2010/0166928 A1 7/2010 Stamm et al.

\* cited by examiner

BEVERAGE BREWER

BACKGROUND

1. Field

The present disclosure relates to devices used for making hot beverages from organic substances, such as ground coffee beans, tea leaves, and herbs.

2. State of the Art

U.S. Pat. No. 5,586,484 (Piazza) relates to a two-container (upper and lower containers) coffee maker in which coffee grounds are placed within a subassembly called the coffee basket assembly. The coffee basket assembly comprises a hollow cylinder piece and a piston. During a brewing cycle, as steam and superheated water from the lower container flow upward through the piston and through the coffee grounds, the piston moves upwardly, compressing the coffee grounds between the piston and a perforated plate at the bottom of the upper container. The patented coffee maker subjects the grounds to a unique combination of temperature and compression. That patented coffee maker facilitates extracting essences from the coffee grounds in a quick and efficient manner, producing espresso and other varieties of coffee beverage with flavor found pleasing to many users of the coffee maker.

SUMMARY

A brewer for coffee, tea, herbal tea or other raw brewing ingredients, hereinafter referred to as "grounds", is described hereinbelow that subjects the grounds to a combination of compression and flow of high temperature fluids (e.g., water and steam) which improves brewing beverages.

In accordance with one aspect, a device for brewing hot beverages comprises a lower container for receiving and heating water, a connected upper container for receiving beverage, and a piston-cylinder assembly for receiving grounds from which beverage is to be made. The piston-cylinder assembly is captured within the lower container. The bottom of the upper container includes a perforated plate that is operably disposed adjacent the top of the piston-cylinder assembly.

The piston-cylinder assembly comprises a cylinder and a piston subassembly movable in the cylinder. The piston subassembly includes a frusto-conical diffuser fixedly attached to a diffuser plate. The diffuser plate has a plurality of holes therethrough. Grounds are loaded into the interior space of the cylinder above the diffuser plate and below the perforated plate of the upper container. The frusto-conical diffuser defines an orifice at its lower end. The orifice functions as a nozzle and leads to a tapered frusto-conical cavity defined by a conical inner surface of the frusto-conical diffuser. The diffuser plate is mounted to the frusto-conical diffuser at or near the top end of the tapered frusto-conical cavity. The diameter of the conical inner surface at the lower end of the frusto-conical cavity is less than the diameter of the conical inner surface at the top end of the frusto-conical cavity. In this configuration, the frusto-conical cavity provides an expansion chamber for high pressure fluid that is introduced through the nozzle orifice at its lower end. A bearing structure, such as a cylindrical wall, may extend downward from the diffuser plate. The bearing structure may slidably interface with an inner wall of the cylinder during movement of the piston subassembly relative to the cylinder.

The piston subassembly further includes a freely movable mass captured between the conical inner surface of the frusto-conical diffuser and the diffuser plate. During the initial period of a brew cycle, the mass is positioned at a valve seat the lower end of the frusto-conical cavity (expansion chamber) to operatively block the flow of pressured fluid (e.g., steam) from the lower container through the nozzle orifice. In this initial period of the brew cycle, the pressure of the fluid in the lower container is insufficient to displace the weight of the mass from the valve set. When the pressure of the fluid in the lower container becomes pressurized sufficiently to displace the mass from the valve seat, the pressured fluid (e.g., steam and superheated water) passes through the nozzle at relatively high pressure and velocity, flows upward through the frusto-conical cavity (expansion chamber) and exits the expansion chamber at lowered pressure. The fluid (e.g., water and steam) then flows through the holes of the diffuser plate, through the grounds, through the perforated plate of the upper container and into the upper container, which collects brewed beverage. During this process, the pressure applied to the piston subassembly by the pressured fluid of the lower container causes the piston subassembly to move upwardly within the cylinder and progressively compress the grounds. Preferably, the flow area of the orifice of the nozzle is several times less than the total flow area of the holes in the diffuser plate. For example, the nozzle orifice may be 0.89 mm diameter and it will have an area 32 times less than the total area of the holes in the diffuser plate, such as a preferred 32 holes of 0.89 mm diameter.

The frusto-conical cavity (expansion chamber) of the diffuser expansion lowers the pressure and velocity of the fluid (e.g., steam and water) flowing through the frusto-conical cavity (expansion chamber) and flowing into the grounds. However, the mass causes the pressure entering the frusto-conical cavity (expansion chamber) of the diffuser to be at a higher pressure than would otherwise occur without the mass, such that the pressure of the fluid flowing into the grounds is also higher than would occur without the mass, even though there is a differential pressure within the frusto-conical cavity (expansion chamber). The pressure at the exit of the frusto-conical cavity (expansion chamber) is substantially less than the pressure in the lower container. Typically, the pressure is no more than 50 percent, more typically no more than 15-30 percent of the pressure in the lower container. In an idealized characterization of the brewing cycle, the pressure and compressive force on the grounds is raised gradually at first, while water saturates the grounds. Then, the pressure is held constant while the grounds are compressed. Then, steam is passed through the grounds to remove excess water. Finally, the heat is removed from the lower container, the pressure drops and compressive force is released; and, the piston retracts to its start position.

When the piston-cylinder assembly is shaken, the loose mass is free to move in the expansion chamber and to contact the diffuser plate. Thus, it is possible that by manually shaking or agitating the piston-cylinder assembly, the mass may hit the diffuser plate, which may aid in removing grounds that may be blocking holes in the diffuser plate. The removal of grounds facilitates cleaning the flow paths through the piston-cylinder assembly.

The invention simplifies the manufacture of a brewer for coffee, tea, herbal teas, and other grounds and improves the process. The term "grounds" in the foregoing text is used for simplicity and is intended to encompass the processing of coffee grounds, tea leaves, herbs, and so forth. A desirable combination of compression and heating and fluid flow are obtained.

The foregoing and other objects, features and advantages of the invention will become more apparent from the following description of the preferred embodiments and accompanying drawings.

DETAILED DESCRIPTION

The present invention has relation to the device described in U.S. Pat. No. 5,970,850, entitled COFFEE, TEA AND HERBAL TEA MAKER. The Detailed Description and Figures referred to therein are hereby incorporated by reference. The present disclosure relates to a beverage brewer that subjects coffee grounds and other materials to a brewing cycle.

The brewer described herein is constructed to extract essences, etc., from organic materials, such as coffee, tea, and herb leaves and stems, to generate brewed beverages. Such organic raw materials are referred to herein as "grounds".

Figure 1:
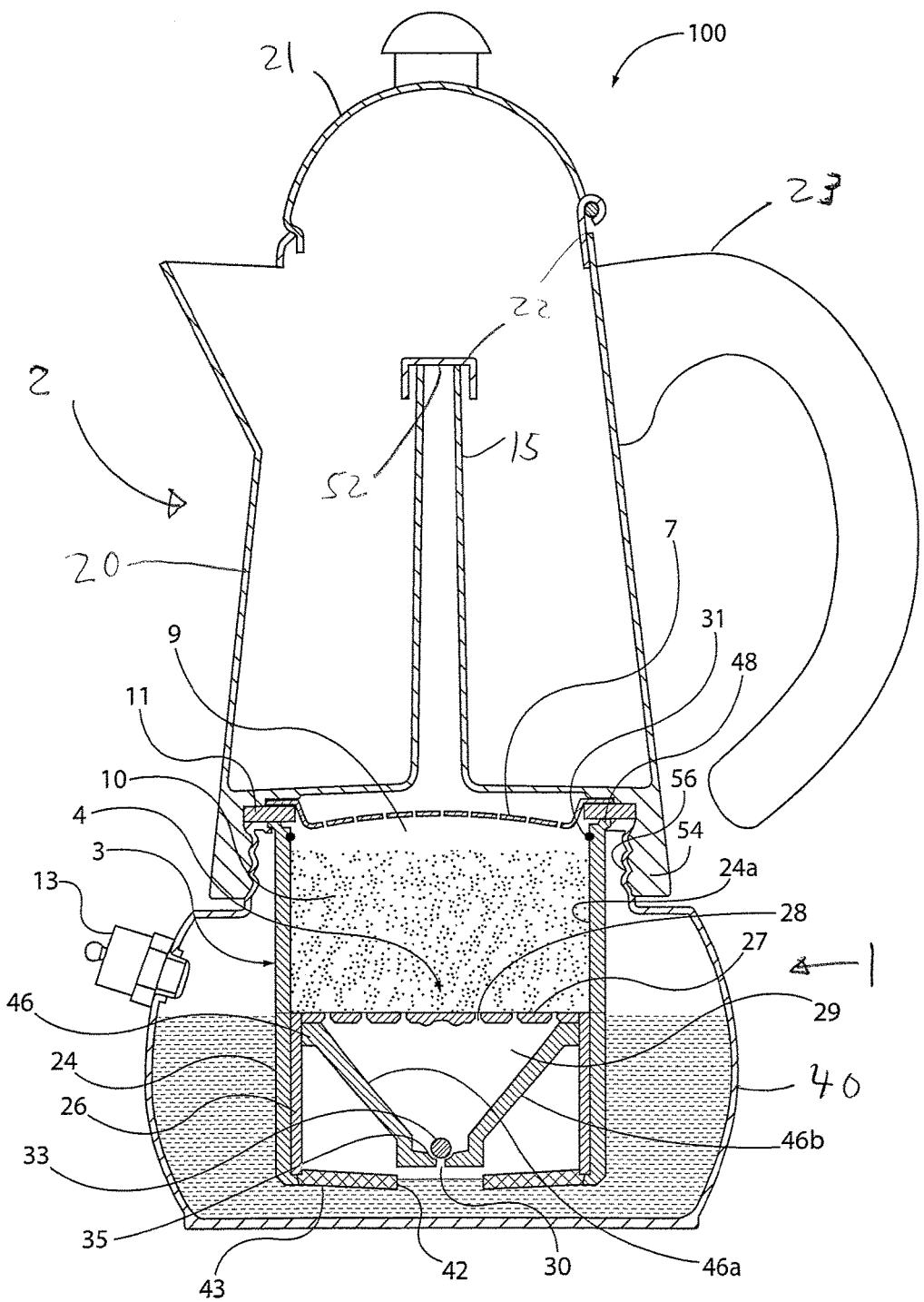
FIG. 1 is a vertical cross sectional centerline view of a beverage brewer at the start of the brewing process.

FIG. 1 shows a view of a brewer 100 along a vertical centerline cross-section thereof. The brewer 100 includes a lower container assembly 1 for heating water and generating steam, a piston-cylinder assembly 3 for holding grounds and receiving the heated water and steam from the lower container 1, and an upper container assembly 2 for receiving brewed beverage from the piston-cylinder assembly 3.

The upper container assembly 2 includes a tapered cylinder container 20, hinged cap 21, handle 23, and a threaded open bottom end 54. Pressed in place within the open bottom end of the upper container assembly is an upper perforated plate 7 having a plurality of through openings. The upper container assembly 2 has an integral inverted interior funnel 15, the smaller part of which rises vertically as a standpipe. At the upper end of the funnel standpipe is an opening 52 and a cap 22 to divert fluid passing through the opening downwardly.

The lower container assembly 1 comprises a squat oblate container 40, a pressure relief valve 13, and a threaded top 56, which engages the threaded bottom 54 of the upper container assembly. Gasket 11 forms a seal between the two assemblies.

The piston-cylinder assembly 3 comprises a piston subassembly 4 that slides in a hollow flanged cylinder 24. The top portion of the cylinder 24 can be filled with organic substances (hereinafter referred to as grounds 10), such as coffee, tee, and/or herbs. During use, pressurized steam in the lower container assembly 1 drives the piston subassembly upward, compressing the grounds 10 during a brewing cycle.

The piston sub-assembly 4 includes an upper diffuser plate 27, a diffuser 46 attached to the diffuser plate 27, and a mass 33 disposed between the diffuser plate 27 and the diffuser 46. The diffuser plate 27 has a multiplicity of holes 28. The diffuser 46 is fixedly attached to the diffuser plate 27 so that there is no relative motion therebetween. A bearing surface 26, embodied as a cylindrical wall, may also extend vertically from an outer edge of the diffuser plate 27 and/or diffuser 46. The bearing surface 26 facilitates sliding of the piston sub-assembly 4 relative to the cylinder 24.

An expansion chamber 29 is defined between the diffuser plate 27 and an inner conical surface 46a of the diffuser 46. The diffuser 46 has a single, central nozzle 30 formed in a lower end of the diffuser 46. A valve seat 35 is formed in the inner conical surface at the exit of the nozzle 30. The mass 33, which is embodied as a sphere in FIGS. 1 to 3, 5, 8, and 9A to 9C, is disposed in the expansion chamber 29, which may be operatively seated on the valve seat 35 to obstruct the nozzle 30, and operatively unseated to permit the flow of liquid and vapor through the nozzle 30, as described in greater detail below.

Figure 4:
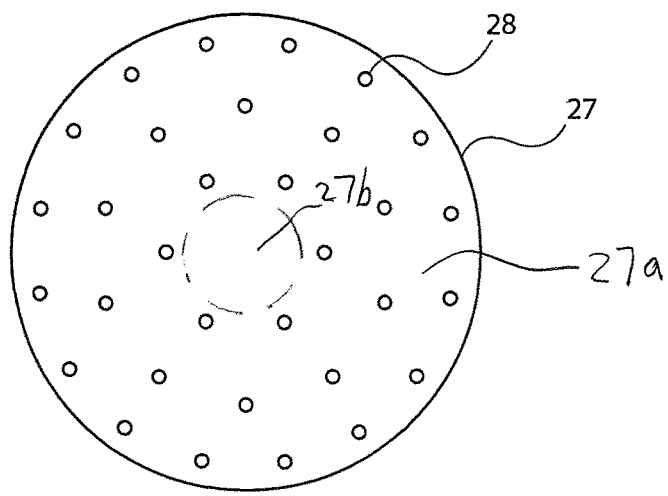
FIG. 4 is a plan view of a diffuser plate.

As will be described in greater detail below, during use the water and steam pressure are elevated at the entry of the expansion chamber 29 and are thereafter decompressed and expanded in the expansion chamber 29 so that the fluid is diffused more evenly across the diffuser plate 27 while increasing the pressure at the diffuser plate 27 in comparison to what the maker of U.S. Pat. No. 5,586,484 (Piazza) could provide. Then, the steam flows at relatively low velocity through the holes 28 of the diffuser plate 27. The conical shape of the inner surface 46a of the diffuser facilitates the distribution of the flow of vapor over an annular peripheral outer portion 27a (FIG. 4) of the diffuser plate 27. The annular peripheral outer portion 27a surrounds a solid central area 27b (FIG. 4) of the diffuser plate 27. The conical surface 46a is angled at an angle θ up to 80 degrees (more preferably, less than 60 degrees, and may be about 45 degrees) with respect to the central axis of the brewer 100. This desirably lessens any potential for "jetting" or "channeling" of the liquid/vapor through the grounds, engenders full utilization of the grounds, and lowers manufacturing cost.

The diffuser 46 has an outer conical surface 46b, which may have the same taper angle as θ as the inner surface 46a, thus making the diffuser 46 a thin walled element. The outer surface 46b may be tapered, rather than flattened, to reduce weight of the diffuser 46, and consequently reduce weight of the piston subassembly 4, to facilitate lifting the piston subassembly 4 with steam generated from the lower container 1.

The mass 33 may operate as a one-way valve, wherein in a first configuration shown in FIG. 1, the mass 33 is seated over the valve seat 35 at the upper end of nozzle 30, thereby blocking flow through nozzle. The weight of the mass 33 contributes to seating the mass 33 over the valve seat. The weight of the mass 33 may be about 0.8 ounce to 1.1 ounce for a chrome steel ball bearing mass. Of course, the mass 33 may be made from from materials (e.g., ceramic) other than chrome steel and may, therefore, have a different range of weights from the examples noted above for a chrome steel ball bearing mass. When fluid pressure in the nozzle 30 is sufficient to counter the weight of the mass 33, the mass 33 lifts off the valve seat 35 in a second configuration shown in FIG. 2, and fluid from the container 1 flows upward through the nozzle 30. Owing to the weight of the mass 33, which must be overcome to start the flow through the nozzle 30, the pressure of the vapor must be increased above that which would be necessary if the mass 33 was not present. However, the mass 33 lifts off the valve seat 35 at a lower pressure than the pressure relief valve 13. Thus, the mass 33 can control the pressure of vapor passing through the nozzle 30 and, in turn, the pressure of fluid reaching the openings 28 in the diffuser plate 27.

The mass 33 is movable within the expansion chamber 29 such that when the piston assembly 3 or brewer 100 is shaken or otherwise agitated, the freely-movable mass 33 can hit against and contact the diffuser plate 27 to displace any grounds 10 or residue that may be lodged in the holes 28 of the diffuser plate 27.

Figure 5:
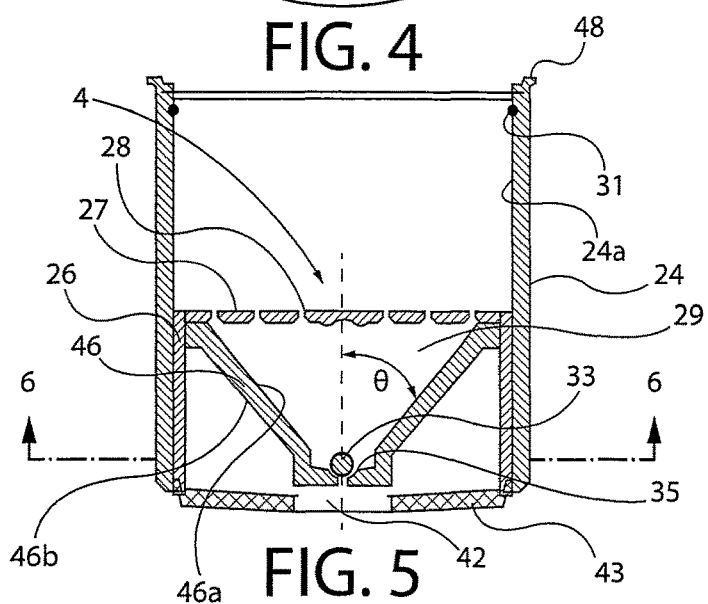
FIG. 5 is a cross sectional elevation view of a piston-cylinder assembly.
Figure 6:
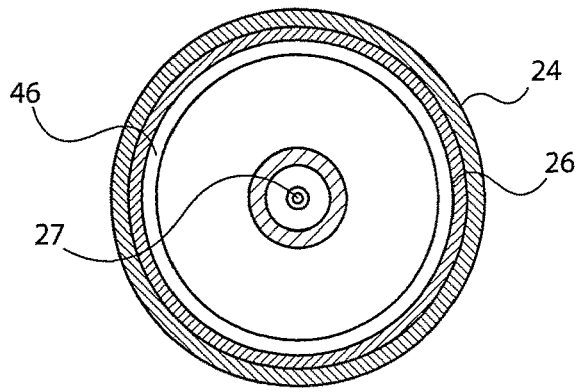
FIG. 6 is a cross sectional view of the piston of the assembly shown in FIG. 5.

The cylinder 24 has an open bottom formed by an annular plate 43 which defines a central opening 42, which is close to the bottom of the inside of lower container assembly 1. In the embodiment shown in FIGS. 1 to 3, 5, 8, and 9A to 9C, the annular plate 43 is shown as a press fit washer, although it will be appreciated that the plate 43 may be formed integrally with cylinder 24 in other embodiments. The piston subassembly 4 fits precisely within the cylinder 24, to run smoothly up and down in the cylinder 24. As noted above, the bearing surface 26 can interface with the interior wall 24a of the cylinder 24 to facilitate smooth movement of the piston subassembly relative to the cylinder 24. It will be appreciated also that where the bearing surface 26 is omitted, the edges of the diffuser plate 27 and/or the diffuser 46 may provide bearing surfaces to facilitate sliding movement with the interior wall 24a of the cylinder 24. With reference to FIG. 5, it can be seen that a circumferential ring 31, set in a groove at the top of an interior wall 24a of cylinder 24, limits vertical motion of the piston subassembly 4 in the upward direction, while the plate 43 limits vertical motion of the piston subassembly 4 in the downward direction. In one example, cylinder 24 has a straight cylindrical shape and an interior finish of 32 microinch AA. The piston subassembly 4 may have an outside diameter of about 57 mm and a travel path (when grounds are not present above the diffuser plate 27) of about 44 mm within the cylinder 24.

A top flange 48 of the cylinder 24 is removably captured between the gasket 11 and the threaded top 56 of lower container assembly so that when the brewer 100 is assembled for use, as shown in FIG. 1, the piston-cylinder assembly 3 projects downwardly from the gasket 11 within the confines of the lower container assembly 1.

Figure 2:
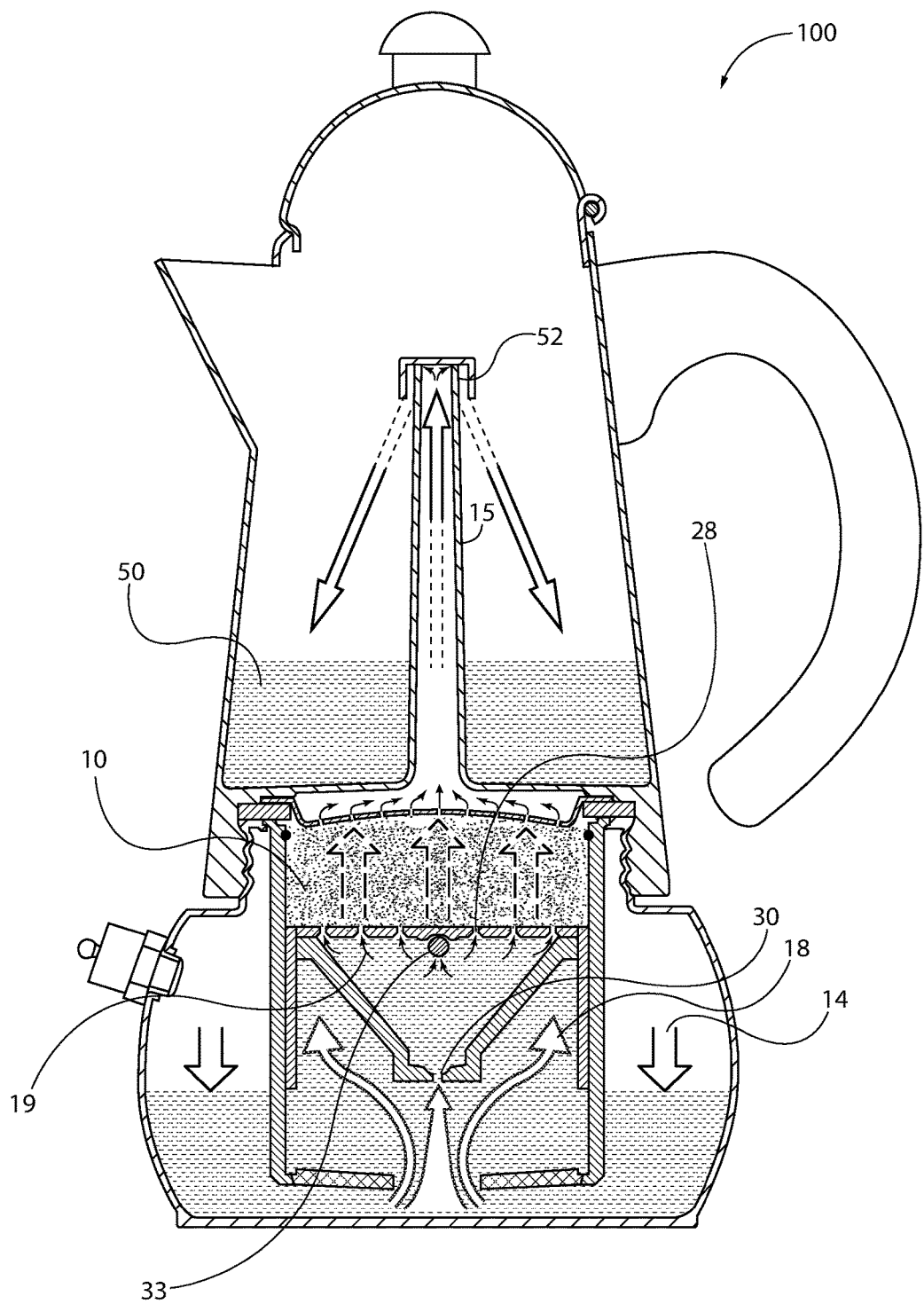
FIG. 2 is like FIG. 1, showing the beverage brewer at a second point during the brewing process.
Figure 3:
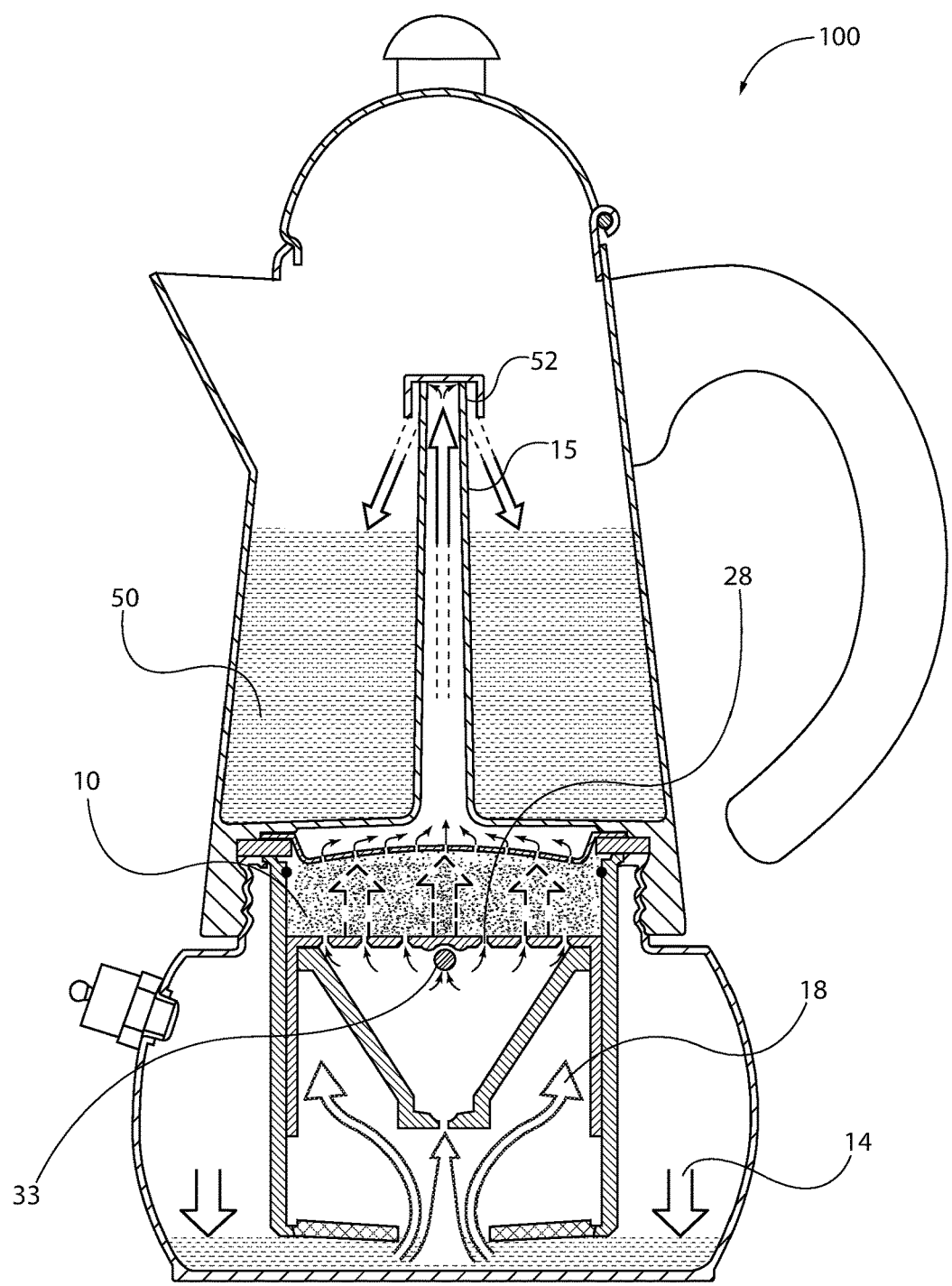
FIG. 3 is like FIG. 1, showing the beverage brewer at a third later point in the brewing process.
Figure 7:
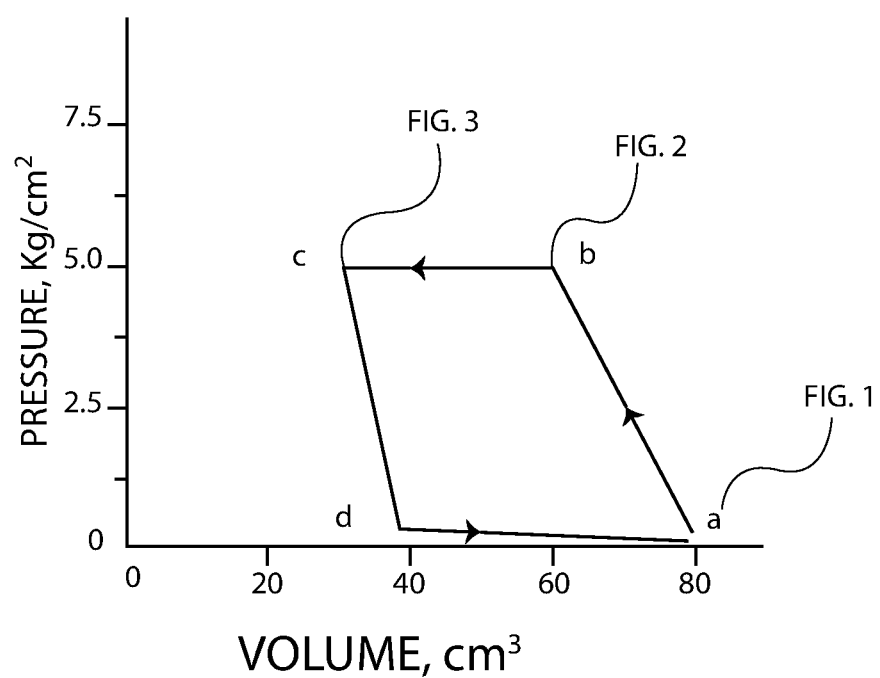
FIG. 7 is plot of typical pressure, volume and compressive force changes to which material placed in a piston-cylinder assembly are subjected during the brewing cycle.

A brewing cycle will now be described with reference to FIGS. 1 to 3 and 7. FIGS. 1 to 3 illustrate a progressive movement of the piston subassembly and flow of water and steam during a brewing cycle. FIG. 7 shows a nominal or idealized pressure-volume curve which characterizes the pressure-volume relationship of the piston subassembly 4 in the cylinder 24 of the brewer 100. Example nominal pressure, volume, and compressive force values of the grounds 10 in the grounds chamber 9 are given for an example brewer 100 that has the example piston dimensions mentioned herein, when coffee grounds 10 are being brewed by the brewer 100.

As illustrated by FIG. 1, at the start of the brewing cycle, a measured quantity 12 of liquid water, for example about 350-400 ml, is placed in the lower container 1. The piston-cylinder assembly 3 is then inserted within the lower container 1. A measured quantity of grounds 10—for example about 35 grams by weight, or about 80 ml by volume of coffee grounds—is placed within a grounds chamber 9 that is formed between the piston-cylinder assembly 3 and the upper perforated plate 7. Grounds 10 are placed upon the diffuser plate 27 of the piston subassembly 4 when the piston subassembly 4 is at its lowermost position, shown in FIG. 1. The upper container 2 is then screwed onto the lower container 1. Heat is then applied to the lower container 1 to boil the water 12. As shown in FIG. 1, the sphere 33 is in a blocking position over nozzle 30. This configuration of the piston subassembly 4 and grounds chamber 9 corresponds to state "a" in FIG. 7.

When the water is sufficiently heated, steam is generated in the lower container 1, exerting pressure on the surface of the liquid water 12 as illustrated by arrows 14. This gradual compression moves the piston subassembly 4 upwards, compressing the grounds 10 in the grounds chamber 9, and corresponds to the path a-b of the brewing cycle in FIG. 7. Referring to FIG. 2, during path a-b, liquid water is caused to flow through the opening 42 at the bottom of the cylinder 24 as indicated by arrows 18. When the water pressure is sufficiently high, it will overcome the weight of the mass (e.g., sphere) 33 blocking the nozzle 30 and will lift the mass 33 away from its obstructing position of the nozzle 30 so that liquid water will pass through the nozzle 30, holes 28, and grounds 10 (as indicated by the phantom arrows 19) which rest on top of the diffuser plate 27. The passing water will thoroughly wet the grounds 10 before there is substantial compression of the grounds 10 by the diffuser plate 27. The liquid water which passes through the grounds 10 continues up the inverted funnel 15 and through opening 52 at a top of the funnel 15, to be discharged downwardly and accumulate as beverage 50 in the upper container 2. Differential pressure across the piston subassembly 4 causes the piston subassembly 4 to move upwardly within cylinder 24, causing the grounds 10 to be compressed between the upper perforated plate 7 and the diffuser plate 27. As the piston subassembly 4 moves upwardly within the cylinder 24, compression on the grounds 10 increases, making the grounds 10 more resistant to the flow of water through the grounds 10. Therefore, during portion a-b of the cycle shown in FIG. 7, the pressure rises, while the volume of the grounds chamber 9 decreases. FIG. 2 shows the state of the grounds chamber 9 at point "b" in the brewing cycle of FIG. 7.

At state "b" of the brewing cycle, a peak pressure in the grounds chamber 9 is reached. See FIG. 7. That peak pressure is a function of the heat rate of the lower container 1, the particular area of nozzle 30, the areas of holes 28 in diffuser plate 27, and the characteristics of the grounds 10 in their compressed and wet conditions. The peak pressure may range between 400-500 kPa. Temperatures associated with the peak pressure may range from about 120-140 degrees Celsius.

Figure 8:
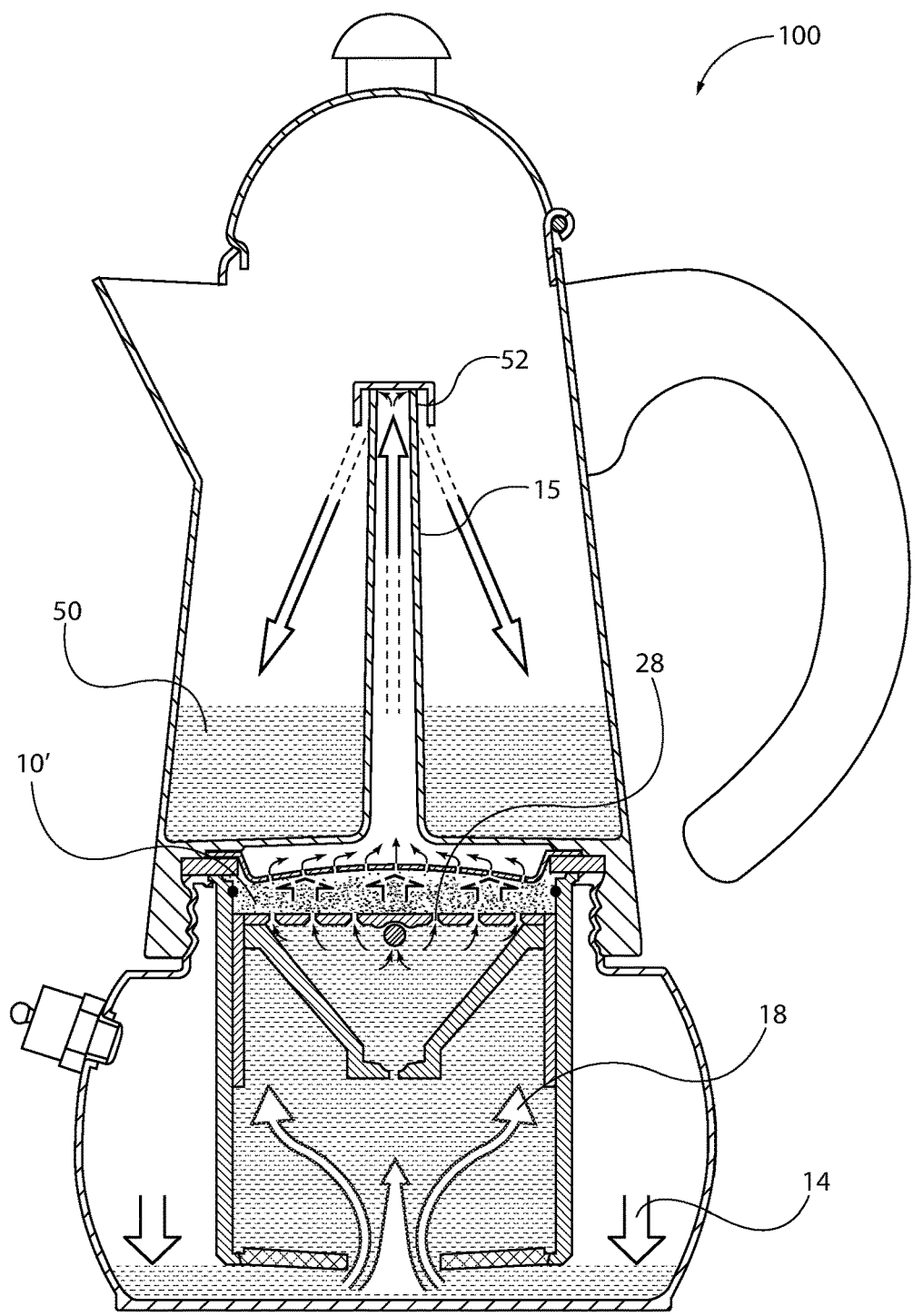
FIG. 8 is like FIG. 2, showing the beverage brewer at a second point during the brewing process, showing how tea leaves tend to occupy a smaller volume when compressed than do the coffee grounds shown in FIG. 1-3.

During portion b-c of the brewing cycle shown in FIG. 7, additional brewed beverage 50 passes into the top chamber 2, while continued pressure is exerted on the grounds 10 in the grounds chamber 9 by the diffuser plate 27 of the piston subassembly 4. The continued pressure causes the grounds 10 to be compressed further (volume of grounds chamber 9 decreases further), while the applied pressure in the grounds chamber 9 remains essentially constant, as illustrated in FIG. 7. The grounds 10 in the grounds chamber 9 become fully compressed at state "c" in FIG. 7, which corresponds to the state of the brewer shown in FIG. 3. FIG. 3 shows that the water level remaining in the lower chamber 1 has decreased to just below the level of the plate 43 of the piston-cylinder assembly 3. In the brewer 100 of the example, in FIG. 3, about 50 ml of liquid remains in the lower container assembly 1. At this water level, steam passes upwardly along the path just described, forcing most of the liquid water upwardly through the grounds 10 and into the upper container 2. At this time in the brewing cycle, there may be a discernible hissing or bubbling sound observable by a user. FIG. 8 shows the same stage as illustrated by FIG. 3, but indicates how the piston 26 will travel relatively further upward when a typical quantity of tea leaves 10' is used, instead of a typical quantity of coffee grounds 10.

When the extraction phase b-c of the brewing cycle is complete, the lower container 1 is removed from the heat source, and the phase c-d of the brewing cycle commences. See FIG. 7. During phase c-d the pressure in the grounds chamber 9 and the differential pressure across the piston subassembly 4 decrease and the piston subassembly 4 moves down slightly due to the reduction in pressure, since there is less steam being generated in the lower container 1. The movement of piston subassembly 4 increases the volume of the grounds chamber 9. At a certain point "d", the differential pressure across the piston subassembly 4 has decreased to a level that is barely sufficient to support the piston subassembly assembly 4 in its elevated position. Thereafter, as pressure in the grounds chamber 9 decreases further from point "d" (at relatively constant and low pressure) to point "a", the weight of the piston subassembly 4 is not supported by the differential pressure and, thus, the piston subassembly 4 moves downward relative to cylinder 24 to its start position "a" shown in FIG. 7, corresponding to the piston 26 position shown in FIG. 1.

Thus, to summarize, the extraction cycle is comprised of two phases. First, in phase a-b the grounds 10 are subjected to rising pressure, and then in phase b-c the grounds 10 are subjected to constant pressure. In phase a-b, the gradually rising pressure desirably enables the loosely packed grounds 10 to become thoroughly wetted before they are tightly compressed. During the phase b-c, there is transformation of heat into useful work. Thermomechanically, such a constant pressure cycle is generally characteristic of a machine having high thermal efficiency. At the end of the constant pressure phase b-c, superheated steam at a temperature of about 120-140 degrees Celsius passes through the grounds 10, extracting hard-to-remove essences and substances, and carrying away most of the water. The superheated steam also provides a desirable sterilizing function for the piston, in particular for the expansion chamber 29.

In the coffee maker of the U.S. Pat. No. 5,586,484 (Piazza), there was no diffuser plate or expansion chamber. The piston top had a multiplicity of small openings, for instance, 32 holes of 0.89 mm dia, or 0.62 sq mm area each, for a total flow area of about 20 sq mm. The total flow area in the prior art piston was selected to achieve a desired compression-temperature cycle. That is, the hole area is made sufficiently small to obtain the desired pressure differential across the piston and resultant compression force on the grounds. However, a corollary of the design is that comparative high velocity water or steam jets from each hole directly into the grounds.

The nozzle 30 diameter will range from 0.75-1.5 mm. In a typical 350-500 ml brewer of the type described above, the diameter of the nozzle 30 may be about 0.89 mm, having an area of about 0.62 sq mm; and, the diffuser plate 27 may have 32-holes, each having a diameter of 0.89 mm, for a total hole area of about 20 sq mm. Thus, the diffuser plate 27 has a flow path cross sectional area about 32 times that of the nozzle 30. As a result, the major fraction of the pressure drop due to flow in the system is taken through the nozzle 30, and thus across the diffuser plate 27. Thus, pressure difference in the device is dominantly applied to the piston top, to thereby produce the desired compressive force on the grounds.

The area of the openings in the upper perforated plate 7 is at least nominally equal to or greater than the area of the openings in the diffuser plate 27. For example, the upper perforated plate 7 may have a flow area of at least two, and up to four times, the flow area of the diffuser plate 27. For example, the upper perforated plate 7 may have more than 300 holes, each hole having a diameter of 0.5 mm. The upper plate 7 is used primarily to retain the grounds 10 in the piston-cylinder assembly 3 under the compressive force of the piston subassembly 4. The grounds 10 themselves will provide some resistance to flow. However, the additional resistances of the grounds 10 and the upper perforated plate 7 are not great compared to that of the nozzle 30. Thus, whenever there is flow through the grounds 10 and the upper plate 7, the pressure in expansion chamber 29 is always substantially lower than the pressure in the lower container 1. Measurements indicate that even under conditions of highest flow and greatest flow resistance of grounds 10, the pressure in the expansion chamber 29 will not exceed about 50 percent of the pressure in the lower container 1, and typically is in the range of 15 to 30 percent.

The high temperature and pressure are desirably effective in extracting from the grounds 10 a greater quantity of essence per unit volume or mass than is achieved when greater than atmospheric pressure is not employed. Not only is efficiency increased—so that less grounds are required, but it is believed that the high temperatures desirably extract from the grounds different proportions and combinations of essences than is possible with devices operating at essentially atmospheric pressure.

Figure 9A:
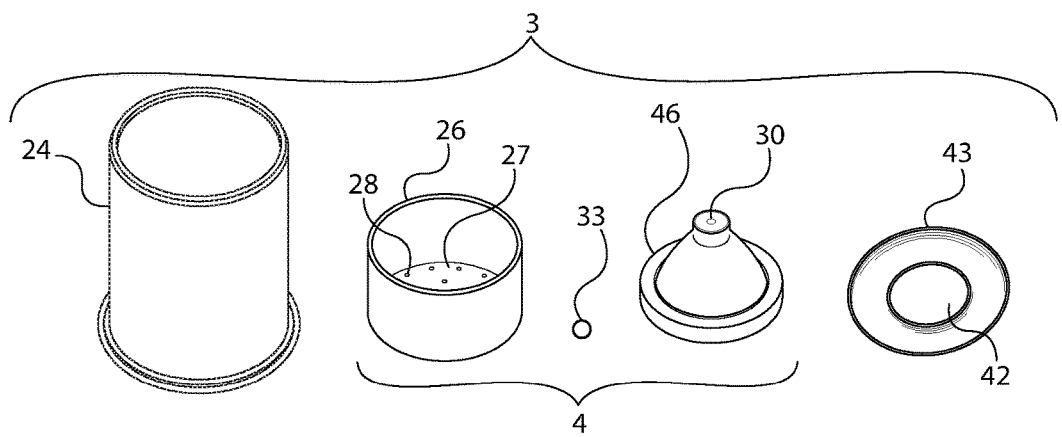
FIG. 9A illustrates parts of the piston cylinder assembly of FIG. 5.
Figure 9B:
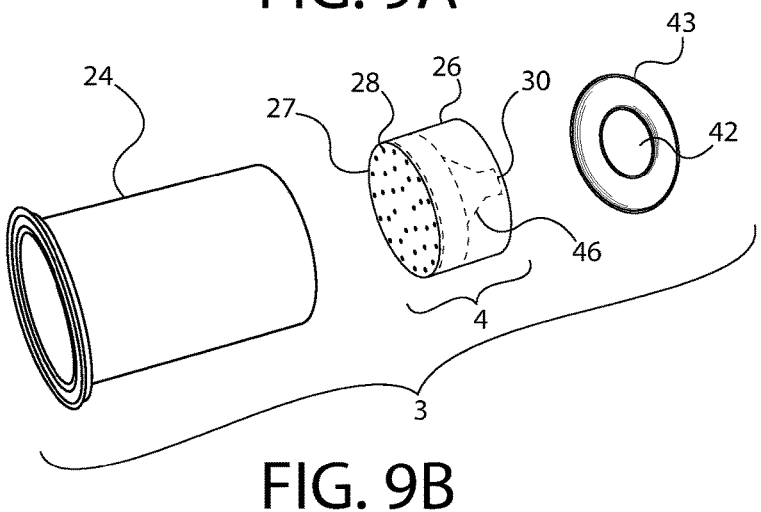
FIG. 9B illustrates an assembly view of the piston cylinder assembly of FIG. 9A showing the piston, diffuser, and mass assembled as a subassembly.
Figure 9C:
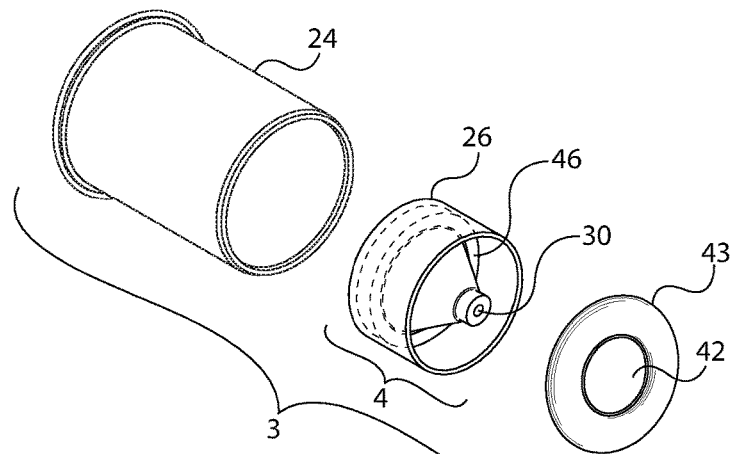
FIG. 9C illustrates the assembly of FIG. 9B viewed from an opposite orientation.

FIGS. 9A to 9C illustrate one method of assembling the piston-cylinder assembly 3. FIGS. 9B and 9C show the formation of a piston subassembly 4 formed from the diffuser plate 27, the diffuser 46, and the mass 33 shown in FIG. 9A. The subassembly 4 may be formed by introducing the mass 33 between the diffuser plate 27 and the diffuser 46 and fixedly coupling the diffuser plate 27 and diffuser 46 together. In the embodiment shown in FIGS. 9A to 9C, the diffuser 46 is press fit against an inner side of the bearing surface 26. The piston-cylinder assembly 4 may then be fully assembled by placing the piston subassembly 4 into the cylinder 24, to which plate 43 has been coupled. Preferably, at least one of the cylinder 24, diffuser 46, diffuser plate 27, bearing surface 26, and mass 33 are made of AISI 316 stainless steel.

Although only the preferred embodiment has been described with some alternatives, it will be understood that further changes in form and detail may be made without departing from the spirit and scope of the claimed invention. In particular, variations may be made in the construction and design of the particular components, such as the piston, cylinder and diffuser plate, in carrying out the essential process and objectives which the invention has been described to satisfy.

What is claimed is:

1. A device for brewing beverages from grounds comprising:
    a lower container assembly having an open top and a closed bottom, the lower container configured to contain unbrewed fluid;
    an upper container assembly, for receiving brewed beverage, having a bottom end releasably connected to the top of the lower container assembly, the bottom end having an opening in communication with said lower container open top;
    a perforated plate mounted proximate said bottom end opening, for preventing movement of grounds from the lower container assembly into the upper container assembly by way of said open top and said bottom end opening;
    a piston-cylinder assembly positioned within the lower container assembly, for receiving grounds, the piston-cylinder assembly comprising
        (a) a cylinder, for slidably receiving a piston, having an upper end and a lower end, said lower end proximate the bottom of the lower container assembly, and said upper end proximate the top of the lower container assembly;
        (b) a piston assembly, positioned within the cylinder and slidable within the cylinder from said lower cylinder end to said upper cylinder end, the piston assembly comprised of:
            (i) a diffuser plate having a plurality of through-holes and for pressing on the grounds, the piston to thereby compress the grounds placed within the cylinder between the diffuser plate and the perforated plate;
            (ii) a diffuser fixedly coupled to the diffuser plate defining an expansion chamber therebetween, the diffuser having a conical inner surface spaced from and facing the diffuser plate, the conical inner surface extending from an upper end proximate the diffuser plate to a lower end, the diffuser having a valve seat at the lower end of the conical inner surface, the valve seat defining a central orifice for providing a fluid pathway for the unbrewed fluid in the lower container to enter the expansion chamber; and
            (iii) at least one loose mass disposed in the expansion chamber, wherein the mass is configured to selectively seat on the valve seat and obstruct the central orifice based upon the state of the unbrewed fluid in the lower container.

2. The device of claim 1, wherein the flow path area of the through-holes in the diffuser plate is greater than the flow path area of the central orifice in the diffuser.

3. The device of claim 2, wherein the ratio between the diffuser plate flow path area and the flow path area of the central orifice in the diffuser is at least 20 to 1.

4. The device of claim 1 wherein, when liquid water is serially flowed during use from the lower container, through the central orifice, into the expansion chamber, and through the perforated plate, the pressure in the expansion chamber is substantially less than the pressure in the lower container.

5. The device of claim 4, wherein the pressure in the expansion chamber is between 15 and 50 percent of the pressure in the lower container.

6. The device of claim 1, wherein the conical inner surface of the diffuser extends at an angle with respect to a vertical axis through the device, wherein the angle is less than 80 degrees.

7. The device of claim 2, wherein the diameter of the central orifice is 0.75 mm to 1.5 mm, and wherein the diffuser plate has a plurality of openings having a total area of at least 16 sq. mm.

8. The device of claim 1, wherein the mass is formed as a sphere.

9. The device of claim 8, wherein the sphere has a diameter of 0.265 inch to 0.3 inch.

10. The device of claim 1, wherein the diffuser plate has a central solid area extending radially outward from a center of the diffuser plate to an annular peripheral area that defines the plurality of through-holes in the diffuser plate.

11. The device of claim 10, wherein the through-holes are arranged radially with respect to a center of the diffuser plate.

12. The device of claim 10, wherein the through-holes have a diameter that is the same as the diameter of the central orifice of the diffuser.

13. The device of claim 12, wherein the diameters of the through-holes and the diameter of the central orifice are about 0.035 inch.

14. The device of claim 1, wherein the at least one loose mass, when unseated from the valve seat, is free to move in the expansion chamber and to contact any portion of the diffuser plate that is in the expansion chamber to facilitate displacing grounds lodged in the through-holes.

15. The device of claim 14, wherein the at least one loose mass, wherein the at least one loose mass, when unseated from the valve seat, is free to contact any portion of the conical inner surface of the diffuser.

16. In a device, for making beverages from grounds during a brewing cycle, comprised of an upper container assembly and a lower container assembly mated thereto for receiving unbrewed fluid at the start of the brewing cycle; the lower container assembly containing a cylinder within which is positioned a vertically movable piston; wherein the piston has a top diffuser plate with at least one opening for passage of unbrewed fluid upwardly therethrough; wherein, unbrewed fluid flows upwardly through the at least one opening in the top diffuser plate of the piston and grounds placed within the cylinder above the piston, and then into the upper container assembly as a beverage, during the brewing cycle, as the piston moves upwardly due to pressure generated by heating unbrewed fluid in the lower container assembly; the improvement which comprises:
    a diffuser, fixedly coupled to the diffuser plate within the piston below the top of the piston and moveable therewith relative to the cylinder, the diffuser and diffuser plate defining an expansion chamber therebetween, the diffuser having a conical inner surface spaced from and facing the diffuser plate, the conical inner surface extending from an upper end proximate the diffuser plate to a lower end, the diffuser having a valve seat in the expansion chamber at the lower end of the conical inner surface, the valve seat defining a central orifice for providing a fluid pathway for the unbrewed fluid in the lower container to enter the expansion chamber; and
    a one-way valve disposed in the expansion chamber, wherein the one-way valve is configured to selectively seat on the valve seat and obstruct the central orifice based upon the state of the unbrewed fluid in the lower container.

17. The device according to claim 16, wherein the one-way valve comprises
> at least one loose mass disposed in the expansion chamber, wherein the mass is configured to selectively obstruct the central orifice based upon the state of the unbrewed fluid in the lower container.

18. The device according to claim 17, wherein the mass is formed as a sphere.

19. The device according to claim 18, wherein the sphere has a diameter of 0.265 inch to 0.3 inch.

20. The device of claim 16, wherein the conical inner surface of the diffuser extends at an angle with respect to a vertical axis through the device, wherein the angle is less than 80 degrees.

21. The device of claim 19, wherein the diameter of the central orifice is 0.75 mm to 1.5 mm, and wherein the top of piston has a plurality of openings having a total area of at least 16 sq. mm.

22. The device of claim 16, wherein a flow path area of holes in the top of the piston is greater than the flow path area of the central orifice in the diffuser.

23. The device of claim 16, wherein the at least one loose mass, when unseated from the valve seat, is free to move in the expansion chamber and to contact any portion of the diffuser plate that is in the expansion chamber to facilitate displacing grounds lodged in the at least one opening of the diffuser plate.

24. The device of claim 23, wherein the at least one loose mass, wherein the at least one loose mass, when unseated from the valve seat, is free to contact any portion of the conical inner surface of the diffuser.

* * * * *